(12) United States Patent
Haraga

(10) Patent No.: US 6,351,604 B1
(45) Date of Patent: Feb. 26, 2002

(54) LENS-FITTED FILM UNIT

(75) Inventor: Hideaki Haraga, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/315,377

(22) Filed: May 18, 1999

(30) Foreign Application Priority Data

May 22, 1998 (JP) .......................................... 10-158427

(51) Int. Cl.$^7$ .............................................. G03B 17/02
(52) U.S. Cl. ........................................... 396/6; 396/155
(58) Field of Search ........................... 396/6, 336, 323, 396/535, 335, 541

(56) References Cited

U.S. PATENT DOCUMENTS

| | | | | |
|---|---|---|---|---|
| 4,560,261 A | * | 12/1985 | Ueda et al. .................. | 396/336 |
| 4,827,298 A | * | 5/1989 | Sasaki et al. ................... | 396/6 |
| 5,608,477 A | * | 3/1997 | Shimizu et al. ................. | 396/6 |
| 5,721,963 A | * | 2/1998 | Iwagaki et al. ................. | 396/6 |
| 5,875,357 A | * | 2/1999 | Motomura et al. ............. | 396/6 |

FOREIGN PATENT DOCUMENTS

| | | |
|---|---|---|
| EP | 0 537 908 A2 | 4/1993 |
| EP | 0 833 191 A1 | 4/1998 |
| JP | 5-188454 | 7/1993 |
| JP | 8-129249 | 5/1996 |

OTHER PUBLICATIONS

Fujifilm Disclosure on Quicksnap Cameras, Sep. 18, 1996, published on the internet by Fujifilm, located at <www.fujifilm.co.jp/eng/salon/pkna/aps–3.html>.*

* cited by examiner

*Primary Examiner*—Russell Adams
*Assistant Examiner*—Kenneth J Whittington
(74) *Attorney, Agent, or Firm*—Frishauf, Holtz, Goodman, Langer & Chick, P.C.

(57) ABSTRACT

In a lens-fitted film unit provided with an unexposed film having an ISO sensitivity Sviso; a lens having a fixed focal length of f (mm) and a fixed f-number F; a shutter having a fixed shutter speed T (sec); a system sensitivity index S is larger than 0 and not larger than 4.5; wherein the system sensitivity index S is represented as follows: S=EV value Ev−Film sensitivity index Sv, Ev=3.32 $\log_{10}$ (F$^2$/T) Sv=3.32 $\log_{10}$(0.3×Sviso)

13 Claims, 3 Drawing Sheets

LENS-FITTED FILM UNIT

BACKGROUND OF THE INVENTION

The present invention relates to a lens-fitted film unit in which a silver halide color photographic light-sensitive material is loaded, an image outputting method and a print, and more particularly, to a lens-fitted film unit, an image outputting method and a print which make it possible to obtain a high quality color print with less failure even when photographing under the conditions of under exposure and over exposure.

What is called a lens-fitted film unit which is sold in a condition that a silver halide light-sensitive material (hereinafter referred to as a light-sensitive material, or a film) is loaded in a plastic camera equipped with a simple and fixed focus lens, has spread recently. This lens-fitted film unit has eliminated the trouble of loading a film in an ordinary camera and eliminated the failure caused by erroneous loading, and increased photographing chances with its simple and convenient nature.

A lens-fitted film unit is a photographing unit in which a light-sensitive material is loaded in advance by a maker as is widely known, and it is used by a user only for photographing on one roll of the loaded light-sensitive material, and after completion of photographing, the lens-fitted film unit is sent to a photofinisher together with a light-sensitive material housed in the lens-fitted film. Therefore, the camera is made to be extremely simple in terms of structure and to be inexpensive in terms of price.

Accordingly, a driving system, an optical system and an electric system of the lens-fitted film unit are extremely simplified because of the targeted low cost of the lens-fitted film unit, which is different from an ordinary camera. Therefore, there are many problems of unsatisfactory finish of processing and unsatisfactory print quality which are desired to be improved.

For example, a camera is designed so that a close-range view through a distant view may be focused even with a fixed focus lens, by making an aperture value to be great, and a film having ISO speed of 320 or more is generally used because sensitivity is insufficient. TOKKAIHEI No. 8-129249 discloses a technology wherein a film with ISO speed of 640 or more is loaded in a lens-fitted film unit whose lens having an Ev value of 13.4–13.9 for decreasing the number of under exposure prints. However, improvement of print quality under the condition of such a high speed film has not been sufficient for users.

When an electronic flash unit is built in a lens-fitted film unit, indoor photographing or photographing at night is possible, and TOKKAIHEI No. 5-188454, for example, discloses a technology wherein print quality is improved by reducing frequency of under exposure in electronic flash photographing by making a guide number (GN) to be 10–15 on a lens-fitted film unit whose lens having an Ev value of 11–13.5. In this technology, however, there still has been a problem that a difference between a highlight and a shadow in background which is out of the radius of electronic flash light is large and unnatural because the distance covered by an electronic flash unit is short, and it is hard to obtain satisfactory prints.

Incidentally, a focal length of the lens of the lens-fitted film unit described in the aforesaid official gazette is about 30 mm, and a film frame size to be exposed is 24×36 mm. By making the focal length to be shorter than the foregoing and by making the film frame size to be exposed to be smaller than the foregoing in terms of area, it is possible to increase an amount of exposure per unit area to be greater than the amount of exposure per unit area in the aforesaid specification. For example, specifications of the disk film camera made by Kodak Co. (Type: Disk 4000) are as follows.

Focal length: 12.5 mm, F value: 2.8, Shutter speed: $\frac{1}{200}$, Ev value: 1.5, Film frame size: 8.2×10.6 mm In the case of this disk film camera, low speed films with ISO speed of about 200 are the only films available, and a speed of a film to be loaded in the camera has been determined by a user based on the condition of photographing. Namely, a film having an optimum ISO speed is loaded in a disk film in advance, and there has been no design concept to determine optimum camera specifications on the assumption of the optimum ISO speed. Therefore, there has been no concept to materialize a camera housing with no electronic flash unit by incorporating a high speed film in advance, or to make a camera smaller or thinner by using no built-in electronic flash unit. In the case of a disk film camera, there has been a case where an electronic flash unit is caused to flash in photographing even under the photographing condition in which the film speed does not need electronic flash, resulting in over exposure.

SUMMARY OF THE INVENTION

An object of the invention is to provide a lens-fitted film unit which reduces the frequency of under exposure and over exposure, and makes it possible to obtain photographic prints which are highly satisfactory even when the camera is a simplified one. The present invention also relates to an image outputting method and photographic prints.

The object stated above can be attained by the following structures.

(1) A lens-fitted film unit having therein an unexposed film which is loaded in advance and has ISO speed of Sviso, a lens having a fixed focal length of f (mm) and a fixed aperture value of F, and a shutter having a fixed shutter speed T (sec), wherein system sensitivity index S is 0–4.5, and following conditions are satisfied.

System sensitivity index S=EV value Ev–Film speed index Sv

Film speed index $Sv=3.32 \log_{10} (0.3 \times Sviso)$

EV value=$3.32 \log_{10} (F^2/T)$ (2) In the lens-fitted film unit, there is provided a body having the maximum thickness of 7 mm–23 mm.

(3) In the lens-fitted film unit, the unexposed film is a sheet film having a film frame size in which a short side is 7 mm to 14 mm and a long side is 10 mm to 20 mm.

(4) In the lens-fitted film unit, the EV value is 6.5 to 11.

(5) In the lens-fitted film unit, an electronic flash unit having G No. of 10 or less is provided.

(6) In the lens-fitted film unit, the fixed focal length is 5 mm to 20 mm.

The object of the invention stated above can further be attained also by the following preferable structures.

(7) A lens-fitted film unit in which an unexposed film is loaded in advance to be ready for photographing, wherein Ev value of the lens-fitted film unit is 6.5 to 11.

(8) The lens-fitted film unit described in the structure (7), wherein a shutter speed constituting the Ev value is $\frac{1}{150}$ sec. to $\frac{1}{25}$ sec.

(9) The lens-fitted film unit described in the structure (7) or (8), wherein an aperture value (F-number) constituting the Ev value is 2 to 8.5.

(10) A lens-fitted film unit in which an unexposed film is loaded in advance to be ready for photographing, and a speed of the loaded unexposed film is adjusted so that the system sensitivity index (S) may be 0 to 4.5, wherein the following is satisfied, System sensitivity index S=Ev−Sv Sv is a film speed index and is represented by the formula: Sv=3.32log$_{10}$ (0.3×ISO speed)

(11) The lens-fitted film unit described in the structure (10), wherein latitude L of the loaded unexposed film satisfies the following expression (1).

$$4.3 \leq L+0.3S \leq 4.9 \quad (1)$$

(12) The lens-fitted film unit described in the structure (11), wherein latitude L and gamma value γ of the loaded unexposed film satisfy the following expression (2).

$$1.0 \leq L \times \gamma \leq 2.0 \quad (2)$$

(13) The lens-fitted film unit described in the structure (11) or (12), wherein latitude L and/or gamma value described in the structure (11) or (12) is satisfied by changing developing conditions for the film.

(14) The lens-fitted film unit described in either one of the structures (7) to (13), wherein no electronic flash unit is housed in the lens-fitted film unit, or an electronic flash unit having its guide number of less than 10 is housed.

(15) The lens-fitted film unit described in either one of the structures (7) to (14), wherein a focal length of a camera lens of the lens-fitted film unit is 5–20 mm.

(16) The lens-fitted film unit described in structures (15), wherein a focal length of a camera lens of the lens-fitted film unit is 5–16 mm.

(17) An image outputting method wherein images of the film which has been subjected to photographing conducted by a lens-fitted film unit described in either one of the structures (7) to (16) above and has been developed are converted into digital image information, then are subjected to contrast adjustment processing, and printed on a print-use silver halide color photographic light-sensitive material.

(18) A print obtained through the image outputting method described in the structure (16).

DETAILED DESCRIPTION OF THE PREFERRED EMBODIMENT

Figure 1:
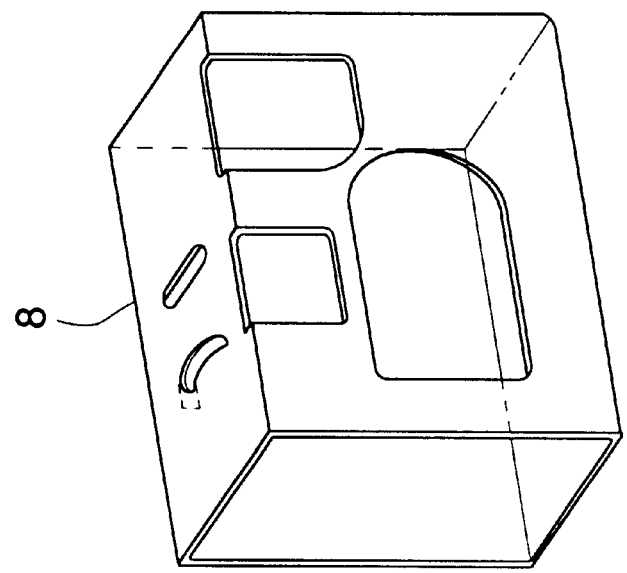
FIG. 1 is a perspective view of a lens-fitted film unit in which a roll film is loaded.
Figure 1:
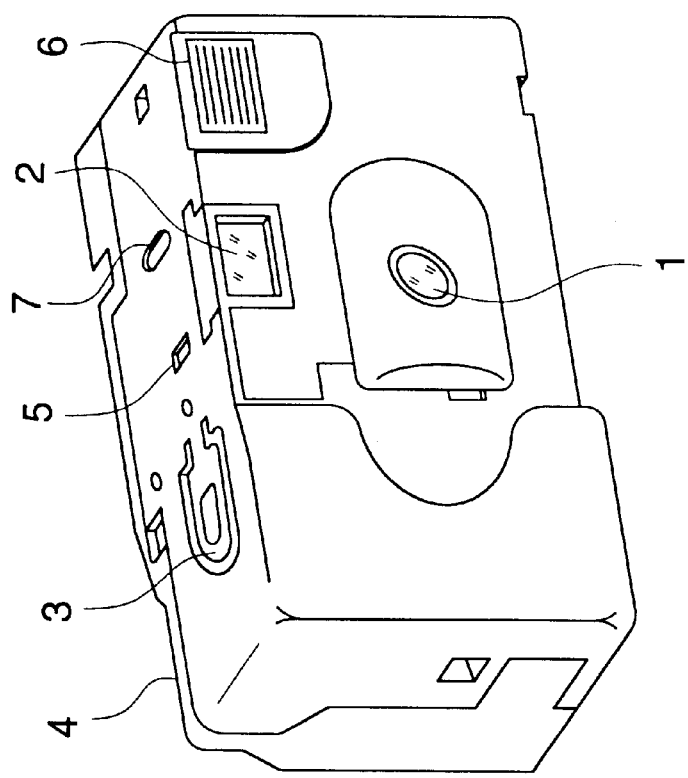

An object of the invention is to make it possible to photograph without using an electronic flash unit even when photographing under a clouded sky or on a rainy day, or in indoor photographing where use of an electronic flash unit has been needed for photographing, by making the system sensitivity index to be 0–4.5 in a lens-fitted film unit in which an unexposed film is loaded in advance. The system sensitivity index in this case is shown by the following expression.

System sensitivity index S=EV value Ev−Film speed index Sv

In the present invention, it may be preferable that the system sensitivity index is 0 to 4.0, and it may be more preferable that the system sensitivity index is 0 to 3.5.

In other words, the system sensitivity index is an index determined by EV value showing the capacity of the lens-fitted film unit to let a quantity of light pass through and the speed of the film loaded in the lens-fitted film unit in advance, and when this index is smaller, total sensitivity of the lens-fitted film unit is better, which makes it possible to photograph without using an electronic flash unit under a cloudy sky, on a rainy day or in a room.

The EV value showing the capacity or a lens-fitted film unit to let a quantity of light pass through is the same as a general definition, and it is indicated by aperture value F and shutter speed T (sec) in the following expression.

$$2^{EV}=F^2/T$$

namely, $$EV=3.32 \log_{10}(F^2/T)$$

It is preferable that EV value for obtaining the system sensitivity index of the invention is 6.5 or more and is less than 11, and the value of 7.5 or more and less than 10 is more preferable. It may be preferable that aperture value (f-number) F for obtaining the EV value is 2 or more and is less than 8.5, it may be more preferable that the aperture value is 2.5 or more and is less than 6.5, and it may be far more preferable that the aperture value is 2.8 or more and less than 5.6. The shutter speed T (sec) is ¹⁄₁₅₀–¹⁄₂₅ sec, and it preferably is ¹⁄₁₀₀–¹⁄₅₀ sec.

The aperture value F stated above is a numerical value obtained by quantifying a f-number of a lens, and it is expressed by the following expression.

Aperture value F=(Focal length f)/(Lens effective aperture D)

When an aperture value of a lens is made smaller, an image formed by the lens is more bright. It is considered to make an effective aperture of the lens greater for the purpose of making the aperture value of the lens smaller. However, when the effective aperture is made greater, a focus adjusting device is needed because the depth of focus is made small, and an image tends to be blurred. To make an aperture value of a lens smaller, therefore, it is preferable to use a lens with a short focal length, and it is possible to increase an amount of exposure per unit area on the film by making the film frame size small in accordance with the short focal length. It is therefore preferable that a focal length of the lens is 5–20 mm, and the focal length ranging from 5 mm to 16 mm is especially preferable. Though a lens may be a single lens in terms of structure, the structure of 2-group 2-element or more is preferable, and in the case of 2-group 2-element, it is preferable to structure with a first lens having negative refraction and a second lens having positive refraction. A film frame size of an unexposed film ranging from 8×12 mm to 12×18 mm is preferable.

When a film frame size is small as stated above, if an ordinary print size is selected in printing, magnification for enlargement is made greater, and printed images tend to be blurred. Therefore, image data obtained by reading an image on a film frame by a film scanner are subjected to image processing such as interpolation processing in accordance with magnification for enlargement, and then a print is made based on the image data after image processing. Thus, an excellent image which is not blurred can be obtained.

Since a lens-fitted film unit of the invention can be used for photographing without using an electronic flash unit even under a cloudy sky, in a rainy day or in a room, the lens-fitted film unit can be made to be a lens-fitted film unit housing no electronic flash unit. Nevertheless, when incorporating an electronic flash unit in the lens-fitted film unit of the invention, it is preferable that a quantity of light of the electronic flash unit is less than that of a conventional lens-fitted film unit. To be concrete, the guide number (GNo) of an electronic flash unit which is not more than 10 is preferable. The guide number which is especially preferable is not more than 8.

Next, the film speed index Sv stated above is expressed by the following expression.

Film speed index $Sv = 3.32 \log_{10} (0.3 \times Sviso)$

With regard to an adjustment of film ISO speed Sviso for obtaining the system sensitivity index of the invention stated above, it can be done by methods including, for example, grain formation of silver halide to be used, grain size, halogen composition, types and quantities of chemical sensitizing agents, types and quantities of inhibitors, silver coating weight and dye addition.

The ISO speed of a light-sensitive material mentioned in the invention is to be determined in accordance with test methods shown below.

(1) Test conditions

The test is made in a room where temperature is 20±5° C. and humidity is 60±10%, and a light-sensitive material to be tested is to be left under these conditions for more than one hour.

(2) Exposure (a) Relative spectral energy distribution of reference light on the exposure surface is to be one shown in Table 1.

TABLE 1

| Wavelength | Relative spectral energy* |
|---|---|
| 360 | 2 |
| 370 | 8 |
| 380 | 14 |
| 390 | 23 |
| 400 | 45 |
| 410 | 57 |
| 420 | 63 |
| 430 | 62 |
| 440 | 31 |
| 450 | 93 |
| 460 | 97 |
| 470 | 98 |
| 480 | 101 |
| 490 | 97 |
| 500 | 100 |
| 510 | 101 |
| 520 | 100 |
| 530 | 104 |
| 540 | 102 |
| 550 | 103 |
| 560 | 100 |
| 570 | 97 |
| 580 | 98 |
| 590 | 90 |
| 600 | 93 |
| 610 | 94 |
| 620 | 92 |
| 630 | 88 |
| 640 | 89 |
| 650 | 86 |
| 660 | 86 |
| 670 | 89 |
| 680 | 85 |
| 690 | 75 |
| 700 | 77 |

*Values determined with a reference of 100 which is a value of 560 nm.

(b) Luminance change on the exposure surface is made by the use of an optical wedge, and the optical wedge to be used is one wherein variation of spectral transmission density is within 10% in an area of less than 400 nm and is within 5% in an area of over 400 nm in wavelength zone of 360–700 nm for all portions of the wedge.

(c) Exposure time is to be 1/100 sec.

(3) Processing Step i) Light-sensitive material to be tested is maintained at 20±5° C. and 60±10% RH between the exposure and development steps.

ii) Development is carried out 30 minutes to 6 hours after the exposure.

iii) The exposed light-sensitive material is processed according to the processing step as described below.

| Color development | 3 min. 15 sec. | 38.0 ± 0.1° C. |
|---|---|---|
| Bleaching | 6 min. 30 sec. | 38.0 ± 3.0° C. |
| Washing | 3 min. 15 sec. | 24–41° C. |
| Fixing | 6 min. 30 sec. | 38.0 ± 3.0° C. |
| Washing | 3 min. 15 sec. | 24–41° C. |
| Stabilizing | 3 min. 15 sec. | 38.0 ± 3.0° C. |
| Drying | not more than 50° C. | |

The composition of the processing solution used in each step are shown below.

(Color developer)

| 4-Amino-3-methyl-N-ethyl-N-(β-hydroxyethyl)-aniline sulfate | 4.75 g |
|---|---|
| Anhydrous sodium sulfite | 4.25 g |
| Hydroxylamine ½ sulfate | 2.0 g |
| Anhydrous potassium carbonate | 37.5 g |
| Sodium bromide | 1.3 g |
| Nitrilotriacetic acid trisodium salt (monohydrate) | 2.5 g |
| Potassium hydroxide | 1.0 g |

Water was added to make 1 liter (pH=10.01).

(Bleach)

| Ferric (III) ammonium salt of ethylenediaminetetraacetic acid | 100.0 g |
|---|---|
| Diammonium of ethylenediaminetetraacetic acid | 10.0 g |
| Ammonium bromide | 150.0 g |
| Glacial acetic acid | 10.0 g |

Water was added to make 1 liter, and the bleach was regulated to pH 6.0 by the use of aqueous ammonia.

(Fixer)

| Ammonium thiosulfate | 175.0 g |
|---|---|
| Anhydrous sodium sulfite | 8.5 g |
| Sodium metasulfite | 2.3 g |

Water was added to make 1 liter, and the fixer was regulated to pH 6.0 by the use of acetic acid.

(Stabilizer)

| Formalin (37% aqueous solution) | 1.5 ml |
|---|---|
| Koniducks (produced by Konica Corporation) | 7.5 ml |

Water was added to make 1 liter.

(4) Measurement of density

Density is expressed in terms of $\log_{10} (\phi_0/\phi)$ wherein $\phi_0$ represents light flux for density measurement, and $\phi$ represents transmitted light flux at the portions to be measured. Geometric conditions for density measurement are to employ parallel light flux perpendicularly incident to the surface to be measured, and transmitted light flux, the total light flux which after transmission, is scattered to the half space. When conditions other than the above are used, correction is made using a density standard. In the density measurement, the emulsion layer surface is faced with a light receiving device. Density to be measured is status M density of blue, green, or red, and its spectral properties are adjusted to be values as shown in Table 2, as the total characteristics of a light source, an optical system, an optical filter, and a light receiving device, which are used in a densitometer.

TABLE 2

Status M density spectral properties
(expressed by logarithms, peak being standardized as 5.00)

| Wavelength nm | Blue | Green | Red | Wavelength nm | Blue | Green | Red |
|---|---|---|---|---|---|---|---|
| 400 | * | * | * | 580 | ** | 3.90 | * |
| 410 | 2.10 | * | * | 590 | ** | 3.15 | * |
| 420 | 4.11 | * | * | 600 | ** | 2.22 | * |
| 430 | 4.63 | * | * | 610 | ** | 1.05 | * |
| 440 | 4.37 | * | * | 620 | ** | ** | 2.11 |
| 450 | 5.00 | * | * | 630 | ** | ** | 4.48 |
| 460 | 4.95 | * | * | 640 | ** | ** | 5.00 |
| 470 | 4.74 | 1.13 | * | 650 | ** | ** | 4.90 |
| 480 | 4.34 | 2.19 | * | 660 | ** | ** | 4.58 |
| 490 | 3.74 | 3.14 | * | 670 | ** | ** | 4.25 |
| 500 | 2.99 | 3.79 | * | 680 | ** | ** | 3.88 |
| 510 | 1.35 | 4.25 | * | 690 | ** | ** | 3.49 |
| 520 | ** | 4.61 | * | 700 | ** | ** | 3.10 |
| 530 | ** | 4.85 | * | 710 | ** | ** | 2.69 |
| 540 | ** | 4.98 | * | 720 | ** | ** | 2.27 |
| 550 | ** | 4.98 | * | 730 | ** | ** | 1.86 |
| 560 | ** | 4.80 | * | 740 | ** | ** | 1.45 |
| 570 | ** | 4.44 | * | 750 | ** | ** | 1.05 ** |

* slope of red: 0.260/nm, slope of green: 0.106/nm, slope of blue: 0.250/nm
** slope of red: 0.040/nm, slope of green: 0.120/nm, slope of blue: 0.220/nm (5) Determination of ISO sensitivity ISO sensitivity is determined according to the following method, employing the results obtained by measuring density of light sensitive material processed under the conditions as shown in items (1) to (4) above.

i) The exposure amount giving a density of minimum blue color density plus 0.15, the exposure amount giving a density of minimum green color density plus 0.15, and the exposure amount giving a density of minimum red color density plus 0.15, each being represented in terms of lx·second, are designated as $H_B$, $H_G$, and $H_R$, respectively.

ii) The larger one (representing a lower sensitivity) of $H_B$ or $H_R$ is designated as $H_S$.

iii) ISO sensitivity is calculated by the following formula:

$$\text{ISO sensitivity} = (^2/H_G \times H_S)^{1/2}$$

In the invention, it may be preferable that latitude L and system sensitivity index S of an unexposed film satisfy the following relationship: $4.3 \leq L+0.3S \leq 4.9$, and it may be preferable for them to satisfy $4.4 \leq L+0.3S \leq 4.75$.

In the invention, latitude L and gamma y satisfy the following relationship: $1.0 \leq L \times \gamma \leq 2.0$, and preferably $1.3 \leq L \times \gamma \leq 1.7$ Herein, a measuring method of latitude L and gamma γ is explained below.

Initially, partial $\gamma_R$, partial $\gamma_G$, and partial $\gamma_B$ are derived from a density function curve D (Log E) of each of a red sensitive layer, a green sensitive layer, and a blue sensitive layer of color photographic light-sensitive material, as follows:

Partial $\gamma_i$ is derived in the exposure amount range (from Log Emin to Log Emax) from the density function curve of each of red density, green density, and blue density, employing the following formula:

Partial $\gamma_i = (D(\text{Log } Ei+0.5) - D(\text{Log } Ei))/0.5$ wherein Log Ei ranges from Log Emin to Log Emax–0.5.

A graph is described in which partial γ at D (Log E) (=optical density at a given exposure amount (log E)) as the axis of the ordinate is plotted against the exposure amount (Log E) as the axis of the abscissa. Thus, a partial γ curve is obtained.

Next, from the partial $\gamma_R$ curve of the red sensitive layer, maximum γ value $\gamma(\max)_R$ and its corresponding exposure amount (Log $E2_R$) are obtained, and then, two exposure amounts Log $E1_R$ and Log $E3_R$, which are located on both sides of Log $E2_R$ and correspond to a value equivalent to 75% of $\gamma(\max)_R$, are obtained, provided that $E1_R < E2_R < E3_R$. Herein, latitude $L_R$ of the red sensitive layer is defined by the following formula:

$$L_R = \text{Log } E3_R - \text{Log } E1_R$$

Regarding the green sensitive layer and blue sensitive layer, $\gamma(\max)_G$, $\gamma(\max)_B$, $L_G$ and $L_B$ are derived in the same manner as in the red sensitive layer.

Employing the above obtained values, latitude L and gamma γ in the invention are defined by the following formulas:

$$L = (L_R + L_G + L_B)/3 \quad \gamma = \gamma(\max)_G$$

Further, in order to adjust a γ value or latitude of a film, with which a lens-fitted film unit is loaded, various methods are employed. These methods include control of a silver halide grain halide composition, doping silver halide grains with a metal ion such as a rhodium or iridium ion, control of kinds or amounts of a development restrainer, kinds or amounts of a DIR compound, or the content ratio of silver to a coupler, and arrangement of plural light-sensitive emulsion layers having sensitivity different from one another. In order to obtain an intended γ value, development conditions of the film can also be controlled. For example, the γ value can be adjusted depending on concentration of a developing agent in a developer, pH or temperature of a developer, or development time. In order to obtain an intended latitude by varying development conditions, concentration of a developing agent, pH or temperature of a developer, or development time is varied in the same way as in the γ value, or a development restrainer or a silver halide solvent is further added to a developer.

The typical development restrainer includes a water soluble halide compound such as potassium bromide or potassium iodide, a nitrogen-containing heterocyclic compound such as a tetrazaindene type compound, a tetrazole type compound, or a triazole type compound, and a mercapto group-containing heterocyclic compound.

As the silver halide solvent, any compound which can dissolve silver halide can be used. The silver halide solvent includes, for example, sodium sulfite, aqueous ammonia, ammonium thiosulfate, and ammonium thiocyanate.

In the present invention, a silver halide emulsion as described in Research Disclosure No. 308119 (hereinafter referred to as RD 308119) is used. The description portions are shown below.

| [Item] | [Page, RD 308119] |
|---|---|
| Iodide composition | 993, I-A |
| Preparation method | 993, I-A and 994, E |
| Crystal habit regular crystal | 993, I-A |
| Crystal habit twinned crystal | 993, I-A |
| Epitaxial | 993, I-A |
| Halide composition (uniform) | 993, I-B |
| Halide composition (non-uniform) | 993, I-B |
| Halide conversion | 994, I-C |
| Halide substitution | 994, I-C |
| Metal doping | 994, I-D |
| Monodispersity | 995, I-F |
| Solvent addition | 995, I-F |
| Latent image forming position (surface) | 995, I-G |
| Latent image forming position (internal) | 995, I-G |
| Negative-working light sensitive material | 995, I-H |
| Positive-working material (containing internally fogged silver halide grains) | 995, I-H |
| Blended emulsion | 995, I-J |
| Desalting | 995, II-A |

In the present invention, a silver halide emulsion is subjected to physical ripening, chemical ripening and spectral sensitization. Additives used in these processes are described in Research Disclosure Nos. 17643, 18716 and 308119 (hereinafter referred to as RD 17643, 18716 and 308119, respectively). The description portions are shown below.

| [Item] | [Page, RD 308119] | [Page, RD 17643] | [Page, RD 18716] |
|---|---|---|---|
| Chemical sensitizer | 996 III-A | 23 | 648 |
| Spectral sensitizer | 996 IV-A-A, B, C, D, H, I, J | 23–24 | 648–649 |
| Super sensitizer | 996 IV-A-E, J | 23–24 | 648–649 |
| Fog inhibitor | 998 VI | 24–25 | 649 |
| Stabilizer | 998 VI | 24–25 | 649 |

Further, additives which can be employed in the present invention are also described in the above Research Disclosures. The relevant description portions are shown below.

| [Item] | [Page, RD 308119] | [Page, RD 17643] | [Page, RD 18716] |
|---|---|---|---|
| Antistain agent | 1002 VII-J | 25 | |
| Dye image stabilizer | 1001 VII-J | 25 | |
| Brightener | 998 V | 24 | |
| UV absorbent | 1003 VIII-I, VIII-C | 25–26 | |
| Light absorbing agent | 1003 VIII | 25–26 | |
| Light scattering agent | 1003 VIII | | |
| Filter dye | 1003 VIII | 25–26 | |
| Binder | 1003 IX | 26 | 651 |
| Antistatic agent | 1006 XIII | 27 | 650 |
| Hardener | 1004 X | 26 | 651 |
| Plasticizer | 1006 XII | 27 | 650 |
| Lubricant | 1006 XII | 27 | 650 |
| Surfactant, coating aid | 1005 XI | 26–27 | 650 |
| Matting agent | 1007 XVI | | |
| Developer-in-emulsion | 1011 XX-B | | |

In the present invention, various kinds of couplers can be employed, examples of which are described in the above Research Disclosures. The relevant description portions are shown below.

| [Item] | [Page, RD 308119] | [RD 17643] |
|---|---|---|
| Yellow coupler | 1001 VII-D | VII C–G |
| Magenta coupler | 1001 VII-D | VII C–G |
| Cyan coupler | 1001 VII-D | VII C–G |
| Colored coupler | 1002 VII-G | VII G |
| DIR coupler | 1001 VII-F | II F |
| BAR coupler | 1002 VII-F | |
| Photographically useful group-releasing coupler | 1001 VII-F | |
| Alkali-soluble coupler | 1001 VII-E | |

Additives usable in the present invention can be added according to a dispersing method described in RD 308119 XIV.

In the invention, supports described on page 28 of RD 17643, on pages 647-8 of RD 18716, and in XIX of RD 308119 can be employed.

The light sensitive material in the invention can be provided with an auxiliary layer such as a filter layer or an interlayer, as described in RD 308119 VII-K.

The light sensitive material in the invention may have any layer structure such as a normal layer structure, an inverted layer structure or a unit layer structure, as described in RD 308119-K.

Development of silver halide color photographic light sensitive material in the invention can be carried out by employing a well-known developer, which is described on pages 291–334 of T. H. James, "The Theory of The Photographic Process", Forth Edition, or in "Journal of the American Chemical Society", Volume 73, No. 3, page 100 (1951). The photographic material can also be processed in a conventional manner as described on pages 28–29 of RD 17643, on page 615 of RD 18716 or in RD 308119 XIX.

The lens-fitted film unit of the invention can also be designed so that digital image processing can be carried out at a later processing step. In this case, the film may be color developed, bleached, and fixed to remove silver from the support. It is also preferred that the developed film not be subjected to bleaching nor both bleaching and fixing to leave a silver image on the support and the image is read by the use of a color scanner. Alternately, it may be preferable to use a method in which a main developing agent is incorporated in a photographic material and a thermal development is conducted.

It is also preferred that an image of the developed film be read by the use of a color scanner to be converted to digital image data, and after that, image contrast, color reproduction, insufficient light amount at periphery of the photographing lens or image distortion be corrected to improve image quality.

The thus obtained image data can be outputted by a color CRT or various color jet printers. The outputting method in a color printer can employ an ink jet process, a sublimation type thermal transfer process, a thermoautochrome process, or light exposure to silver halide color paper, and these processes provide the superior effects of the invention. Of these processes, scanning exposure to silver halide color paper provides the most satisfactory print image.

EXAMPLE

A lens-fitted film unit of the invention is provided in a form wherein an unexposed film is loaded in advance, and after completion of photographing, the film unit in which the film stays without being rewound is sent to a photofinisher. In the photofinisher, the film is taken out of the film unit, and developing and printing are conducted.

FIG. 1 shows a lens-fitted film unit which is most popular now, and a roll film having the frame size of 24×36 mm is loaded in the lens-fitted film unit. In FIG. 1, the numeral 1 represents a camera lens, 2 represents a viewfinder, 3 represents a shutter release button, 4 represents a film-winding knob, 5 represents a film counter window, 6 represents an electronic flash unit, 7 represents an electronic flash charging lamp and 8 represents a cover. Detailed explanation of the structure is described, for example, in TOKKAISHO No. 5-188454.

Figure 2:
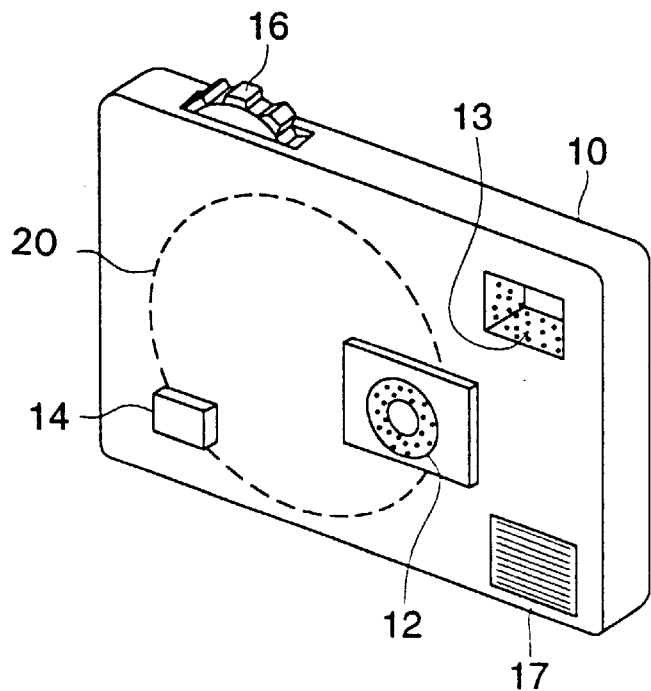
FIG. 2 is a perspective view of a lens-fitted film unit in which a sheet film is loaded.
Figure 3:
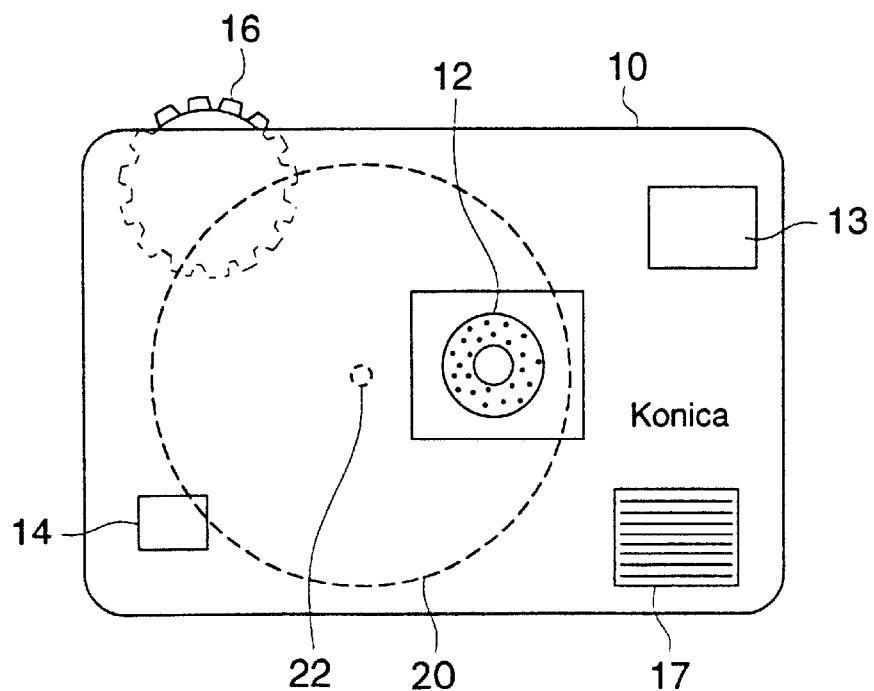
FIG. 3 is a front view of the lens-fitted film unit shown in FIG. 2.

Each of FIG. 2 and FIG. 3 shows a lens-fitted film unit in which a sheet film is loaded.

In FIGS. 2 and 3, the numeral 10 represents a lens-fitted film unit main body which constitutes a lens-fitted film unit of the invention together with camera lens unit 12 and viewfinder 13 both provided on the lens-fitted film unit main body. Inside the lens-fitted film unit main body 10, there is fixed disk-shaped sheet film 20. When shutter release button 14 is pressed, a shutter provided inside lens unit 12 is opened for a prescribed time period, while being interlocked with the shutter release button, and thereby, the sheet film 20 is subjected to imagewise exposure. It is preferable that the shutter release button 14 is installed to be away from lens unit 12 to prevent that photographing is interrupted by a finger of a photographer. Electronic flash unit 17 provided as an option is also positioned preferably to be away from shutter release button 4.

When disk-shaped sheet film 20 is rotated by a certain angle on axis 22 through film-winding lever 16 after completion of photographing on one frame, preparation for the following photographing is completed. By repeating this operation, photographing for a certain number of frames can be conducted. In the present example, sheet type photographic film 20 is just rotated in its plane, and film-winding lever 16 is also rotated in a parallel plane. Therefore, the camera can be designed to be much thinner than a lens-fitted film unit employing a roll film.

Figure 4:
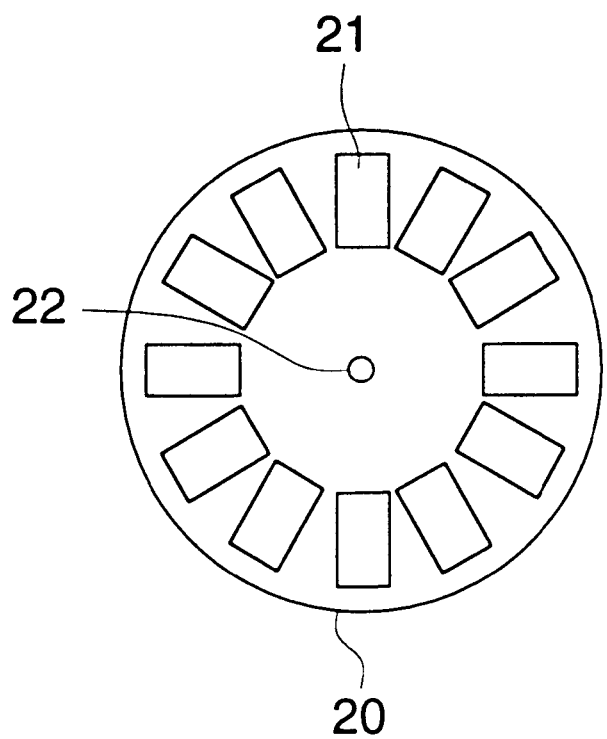
FIG. 4 is an illustration of a disk-shaped sheet film loaded in the lens-fitted film unit shown in FIG. 2.

FIG. 4 is a diagram showing disk-shaped sheet film 20 having film areas 21 and axis 22. It is preferable that the film areas 21 to be exposed are small areas in which a short side is 7 mm to 14 mm and a long side is 10 mm to 20 mm. Due to this, it is possible to employ a lens having a short focal length. In the case of such lens with a short focal length, even when a lens with a small aperture value (namely, small f-number) is used, a depth of field is great. Therefore, an image which is focused for a close range through a long range can be obtained through photographing. It is further possible to photograph in a room without an electronic flash unit, because photographing in gloom is possible.

In the case of the disk film camera made by Kodak stated above, the disk-shaped sheet film is contained in a film cassette composed of a front cover and a rear cover, and it is loaded manually by a user in the disk film camera as a film cassette. Then, after photographing, the film cassette is taken out of the disk film camera to be subjected to developing and printing in a photofinisher.

Even in the case of a lens-fitted film unit of the invention shown in FIG. 2, it is possible to load a film cassette housing therein a disk-shaped sheet film in the lens-fitted film unit, in the same way as in the disk film camera. However, in the case of the lens-fitted film unit, it is loaded with an unexposed film in advance to be put on the market, and it is sent to a photofinisher while holding therein the film after completion of photographing. Therefore, in the case of the lens-fitted film unit of the invention, it is possible to load a disk-shaped sheet film itself in the film unit directly without using a film cassette. Due to this, it is possible to achieve cost reduction by reducing the number of parts and to make the film unit to be thinner by a dimension of a space required for a film cassette.

As stated above, when the system sensitivity index of the lens-fitted film unit of the invention is made to be 0–4.5, the film unit can be used to photograph in a room without using an electronic flash unit, thus, a lens-fitted film unit having no electronic flash unit can be provided. By using no electronic flash unit, cost reduction can further be attained, and the film unit can be made thinner.

Since the maximum thickness of the lens-fitted film unit of the invention can be made to be 7–23 mm for the reasons mentioned above, the present invention makes it possible to provide a pocket-sized lens-fitted film unit of a card type.

Comparative Test 1

Following procedures were kept to make a comparative test.

1. Photographing unit

The photographing units in two types described below were prepared.

In the photographing unit shown in FIG. 1 in which a roll film (frame size: 24×36 mm) is loaded, an f-number and a shutter speed were adjusted respectively to obtain photographing units 1–3 shown in Table 1. Incidentally, a focal length of a camera lens was 30 mm and focusing was conducted for an object which was away from the camera lens by 3 m.

In the photographing unit shown in FIG. 2 in which a sheet film (frame size: 12×8 mm) is loaded, an f-number and a shutter speed were adjusted respectively to obtain photographing units 4–7 shown in Table 3. Incidentally, each of photographing units 4–6 was provided with an electronic flash unit having a guide number of 6. Further, a focal length of a camera lens was 10 mm and focusing was conducted for an object which was away from the camera lens by 3 m.

TABLE 3

| Photographing unit No. | Aperture value | Shutter speed (sec) | Ev value | Electronic flash GN | Focal length of a camera lens (mm) |
|---|---|---|---|---|---|
| Unit 1 (Comparative) | 10 | 1/100 | 13.28 | 11 | 30 |
| Unit 2 (Inventive) | 4.8 | 1/80 | 10.84 | 11 | 30 |
| Unit 3 (Inventive) | 3.5 | 1/80 | 9.93 | 6 | 30 |
| Unit 4 (Inventive) | 3.5 | 1/80 | 9.93 | 6 | 10 |
| Unit 5 (Inventive) | 2.8 | 1/80 | 9.29 | 6 | 10 |
| Unit 6 (Inventive) | 2.8 | 1/30 | 7.87 | 6 | 10 |
| Unit 7 (Inventive) | 2.5 | 1/80 | 8.96 | None | 10 |

2. Photographic Film

Layers having the following composition were coated in order on a subbed cellulose triacetate support. Thus, multi-layered color photographic light sensitive material sample 101 as the photographic film was prepared. In the following composition, the coating amount of components was expressed in $g/m^2$ of the photographic material, unless otherwise specified. The coating amount of silver halide or colloidal silver was converted to silver, being expressed in g per m² of the photographic material, and the coating amount of a sensitizing dye (represented by SD) was expressed in mol per mol of silver contained in the same layer as the dye.

First layer (Antihalation layer)

| | |
|---|---|
| Black colloidal silver | 0.10 |
| UV-1 | 0.3 |
| CM-1 | 0.123 |
| CC-1 | 0.044 |
| OIL-1 | 0.167 |
| Gelatin | 1.33 |

Second layer (Interlayer)

| | |
|---|---|
| AS-1 | 0.160 |
| OIL-1 | 0.20 |
| Gelatin | 0.69 |

Third layer (Low speed red-sensitive layer)

| | |
|---|---|
| Silver iodobromide a | 0.20 |
| Silver iodobromide b | 0.25 |
| SD-1 | $2.37 \times 10^{-5}$ |
| SD-2 | $1.2 \times 10^{-4}$ |
| SD-3 | $2.4 \times 10^{-4}$ |
| SD-4 | $2.4 \times 10^{-6}$ |
| C-1 | 0.32 |
| CC-1 | 0.038 |
| DI-1 | 0.010 |
| OIL-2 | 0.28 |
| AS-2 | 0.002 |
| Gelatin | 0.73 |

Fourth layer (Medium speed red-sensitive layer)

| | |
|---|---|
| Silver iodobromide c | 0.12 |
| Silver iodobromide d | 0.60 |
| SD-1 | $4.5 \times 10^{-5}$ |
| SD-2 | $2.3 \times 10^{-4}$ |
| SD-3 | $4.5 \times 10^{-4}$ |
| C-2 | 0.52 |
| CC-1 | 0.06 |
| DI-1 | 0.047 |
| OIL-2 | 0.46 |
| AS-2 | 0.004 |
| Gelatin | 1.30 |

Fifth layer (High speed red-sensitive layer)

| | |
|---|---|
| Silver iodobromide c | 0.15 |
| Silver iodobromide d | 0.90 |
| SD-1 | $3.0 \times 10^{-5}$ |
| SD-2 | $1.5 \times 10^{-4}$ |
| SD-3 | $3.0 \times 10^{-4}$ |
| C-2 | 0.047 |
| C-3 | 0.09 |
| CC-1 | 0.036 |
| DI-1 | 0.024 |
| OIL-2 | 0.27 |
| AS-2 | 0.006 |
| Gelatin | 1.28 |

Sixth layer (Interlayer)

| | |
|---|---|
| OIL-1 | 0.29 |
| AS-1 | 0.23 |
| Gelatin | 1.00 |

Seventh layer (Low speed green-sensitive layer)

| | |
|---|---|
| Silver iodobromide a | 0.10 |
| Silver iodobromide b | 0.10 |
| SD-4 | $3.6 \times 10^{-4}$ |
| SD-5 | $3.6 \times 10^{-4}$ |
| M-1 | 0.18 |
| CM-1 | 0.033 |
| DI-2 | 0.010 |
| OIL-1 | 0.22 |
| AS-2 | 0.002 |
| AS-3 | 0.05 |
| Gelatin | 0.61 |

Eighth layer (Interlayer)

| | |
|---|---|
| OIL-1 | 0.26 |
| AS-1 | 0.054 |
| Gelatin | 0.80 |

Ninth layer (Medium speed green-sensitive layer)

| | |
|---|---|
| Silver iodobromide c | 0.35 |
| Silver iodobromide d | 0.35 |
| SD-6 | $3.7 \times 10^{-4}$ |
| SD-7 | $7.4 \times 10^{-5}$ |
| SD-8 | $5.0 \times 10^{-5}$ |
| M-1 | 0.17 |
| M-2 | 0.33 |
| CM-1 | 0.024 |
| CM-2 | 0.029 |
| DI-2 | 0.024 |
| DI-3 | 0.005 |
| OIL-1 | 0.73 |
| AS-3 | 0.035 |
| AS-2 | 0.003 |

Tenth layer (High speed green-sensitive layer)

| | |
|---|---|
| Silver iodobromide d | 0.85 |
| SD-6 | $4.0 \times 10^{-4}$ |
| SD-7 | $8.0 \times 10^{-5}$ |
| SD-8 | $5.0 \times 10^{-5}$ |
| M-1 | 0.065 |
| CM-2 | 0.026 |
| CM-1 | 0.022 |
| DI-3 | 0.003 |
| DI-2 | 0.003 |
| OIL-1 | 0.19 |
| OIL-2 | 0.43 |
| AS-3 | 0.017 |
| AS-2 | 0.014 |
| Gelatin | 1.23 |

Eleventh layer (Yellow filter layer)

| | |
|---|---|
| Yellow colloidal silver | 0.05 |
| OIL-1 | 0.18 |
| AS-1 | 0.16 |
| Gelatin | 1.00 |

Twelfth layer (Low speed blue-sensitive layer)

| | |
|---|---|
| Silver iodobromide a | 0.08 |
| Silver iodobromide b | 0.18 |
| Silver iodobromide e | 0.08 |
| SD-9 | $6.5 \times 10^{-4}$ |
| SD-10 | $2.5 \times 10^{-4}$ |
| Y-1 | 0.77 |
| DI-4 | 0.017 |
| OIL-1 | 0.31 |
| AS-2 | 0.002 |
| Gelatin | 1.29 |

Thirteenth layer (High speed blue-sensitive layer)

| | |
|---|---|
| Silver iodobromide e | 0.28 |
| Silver iodobromide f | 0.40 |
| SD-9 | $4.4 \times 10^{-4}$ |
| SD-10 | $1.5 \times 10^{-4}$ |
| Y-1 | 0.23 |
| DI-4 | 0.005 |
| OIL-1 | 0.10 |
| AS-2 | 0.004 |
| Gelatin | 1.20 |

Fourteenth layer (First protective layer)

| | |
|---|---|
| Silver iodobromide g | 0.30 |
| UV-1 | 0.055 |
| UV-2 | 0.110 |
| OIL-2 | 0.30 |
| Gelatin | 1.32 |

Fifteenth layer (Second protective layer)

| | |
|---|---|
| PM-1 | 0.15 |
| PM-2 | 0.04 |
| WAX-1 | 0.02 |
| D-1 | 0.001 |
| Gelatin | 0.55 |

Properties of the above silver iodobromide grains are shown in the following Table. (In the Table, the average grain size is expressed by an average cube-equivalent side length.)

| Emulsion No. Silver iodobromide | Average grain size ($\mu$m) | Average AgI amount (mol %) | Diameter/ Thickness |
|---|---|---|---|
| a | 0.30 | 2.0 | 1.0 |
| b | 0.40 | 2.0 | 4.0 |
| c | 0.60 | 5.0 | 4.0 |
| d | 0.74 | 7.0 | 5.0 |
| e | 0.65 | 7.0 | 2.0 |
| f | 0.90 | 7.0 | 2.0 |
| g | 0.05 | 2.0 | 1.0 |
| h | 0.20 | 4.0 | 1.0 |

As a typical example of preparing the silver halide emulsion in the invention, a preparing method of silver iodobromide d is described below. Silver iodobromide j, k, and l (hereinafter referred to also as emulsions j, k, and l, respectively) were prepared according to the descriptions disclosed in Japanese Patent O.P.I. Publication Nos. 1-183417, 1-183644, 1-183645, and 2-166422).

In the invention, Seed Emulsion-1 was firstly prepared as follows to obtain the silver halide emulsion in the invention.

Preparation of Seed Emulsion-1

The Seed Emulsion was prepared as follows:

Using a mixing stirrer described in Japanese Patent examined Nos. 58-58288 and 58-58289, an aqueous silver nitrate solution (1.161 mol) and an aqueous solution of potassium bromide and potassium iodide (potassium iodide, 2 mol %) were added to Solution A1 maintained at 35° C. over a period of 2 min. by a double jet method to form nucleuses, while being kept at a silver potential of 0 mV (measured with a silver ion selection electrode with reference to saturated silver-silver chloride electrode). Subsequently, the temperature was increased to 60° C. taking 60 min. After the pH was adjusted to 5.0 with an aqueous sodium carbonate solution, an aqueous silver nitrate solution (5.902 mol) and an aqueous solution of potassium bromide and potassium iodide (potassium iodide, 2 mol %) were added thereto over a period of 42 min. by a double jet method, while being kept at a silver potential of 9 mV. After completing the addition, the temperature was lowered to 40° C. and desalting was carried out by a conventional flocculation.

The thus-prepared seed crystal grain emulsion was comprised of silver halide grains having an average grain size (sphere-equivalent diameter) of 0.24 $\mu$m and an average aspect ratio of 4.8, not less than 90% of the projected area of total grains being hexagonal tabular grains having a maximum side length ratio (maximum side length to minimum side length ratio of grains) of 1.0 to 2.0. This emulsion was denoted as Seed emulsion-1.

[Solution A1]

| | |
|---|---|
| Ossein gelatin | 24.2 g |
| Potassium bromide | 10.8 g |
| HO(CH$_2$CH$_2$O)m(CH(CH$_3$)CH$_2$O)$_{19.8}$(CH$_2$CH$_2$O)nH (m + n = 9.77) (10% Ethanol solution) | 6.78 ml |
| 10% Nitric acid | 114 ml |
| H$_2$O | 9657 ml |

Preparation of silver iodide fine grain emulsion SMC-1

To 5 liters of a 6.0 wt % gelatin aqueous solution containing 0.06 mol of potassium iodide, an aqueous silver nitrate solution (7.06 mol) and an aqueous potassium iodide solution (7.06 mol), each 2 liters were added with vigorous stirring over a period of 10 min., while the pH was controlled at 2.0 with nitric acid and the temperature was kept at 40° C. After completing the grain formation, the pH was adjusted to 5.0 using an aqueous solution of sodium carbonate. The resulting emulsion was comprised of silver iodide fine grains having an average grain size of 0.05 μm. This emulsion was denoted as SMC-1.

Preparation of silver iodobromide d

Seven hundred milliliters of a 4.5 wt % inert gelatin aqueous solution containing 0.178 mol equivalent Seed emulsion-1 and 0.5 ml of a 10% ethanol solution of HO(CH$_2$CH$_2$O)m(CH(CH$_3$)CH$_2$O)$_{19.8}$(CH$_2$CH$_2$O)nH (m+n=9.77) were maintained at 75° C., and after the pAg and pH were adjusted to 8.4 and 5.0, respectively, grain formation was carried out with vigorous stirring by a double jet method according to the following sequence.

1) An aqueous 3.093 mol silver nitrate solution, 0.287 mol of SMC-1 and an aqueous potassium bromide solution were added, while being kept at a pAg of 8.4 and pH of 5.0.

2) Subsequently, the temperature of the solution was lowered to 60° C. and the pAg was adjusted to 9.8. Then, 0.071 mol of SMC-1 was added thereto and ripening was carried out further for 2 min. (incorporation of a dislocation line)

3) An aqueous 0.959 mol silver nitrate solution, 0.03 mol of SMC-1 and an aqueous potassium bromide solution were added, while being kept at a pAg of 9.8 and pH of 5.0.

During the course of grain formation, each solution was added at an optimal flowing rate so as not to form new nuclear grains and cause Ostwald ripening. After that addition, the resulting emulsion was washed at 40° C. by a conventional flocculation method, and then redispersed adding gelatin thereto, and the pAg and pH were each adjusted to 8.1 and 5.8, respectively.

The resulting emulsion was shown to be comprised of tabular grains having a grain size (cube-equivalent edge length) of 0.74 μm, an average aspect ratio of 5.0, and a halide composition, 2/8.5/X/3 mol % from inner portions of the grains (X represents a dislocation line incorporation position). According to electron microscope observation, not less than 60% of the total projected area of the grains had 5 or more dislocation lines in each of the fringe portion and inner portion thereof. The surface silver iodide content was 6.7 mol %.

The above obtained emulsion was added with the above described sensitizing dye, and ripened. Thereafter, triphenylphosphine selenide, sodium thiosulfate, chloroauric acid, and potassium thiocyanate were added and chemically sensitized by a conventional method to obtain an optimum relationship between fog and sensitivity.

Silver iodobromide emulsions a, b, c, e, f, h, and i were prepared, and spectrally and chemically sensitized in the same manner as in silver iodobromide emulsion d described above.

In addition to the above compounds, each emulsion was added with coating aids SU-1, SU-2 and SU-3, a dispersion auxiliary SU-4, a viscosity-adjusting agent V-1, stabilizers ST-1 and ST-2, an anti-foggant AF-1 (polyvinyl pyrrolidone with a weight average molecular weight of 10,000), an anti-foggant AF-2 (polyvinyl pyrrolidone with a weight average molecular weight of 1,100,000), restrainers AF-3, AF-4, and AF-5, hardeners H-1 and H-2, and an antiseptic Ase-1.

After completion of the chemical sensitization, restrainer AF-3 was added to silver iodobromide emulsions a, b, c, d, e, and f in an amount of 20 mg/mol Ag, and to silver iodobromide emulsion h in an amount of 70 mg/mol Ag.

The chemical structures of the compounds used in the emulsions described above are shown below.

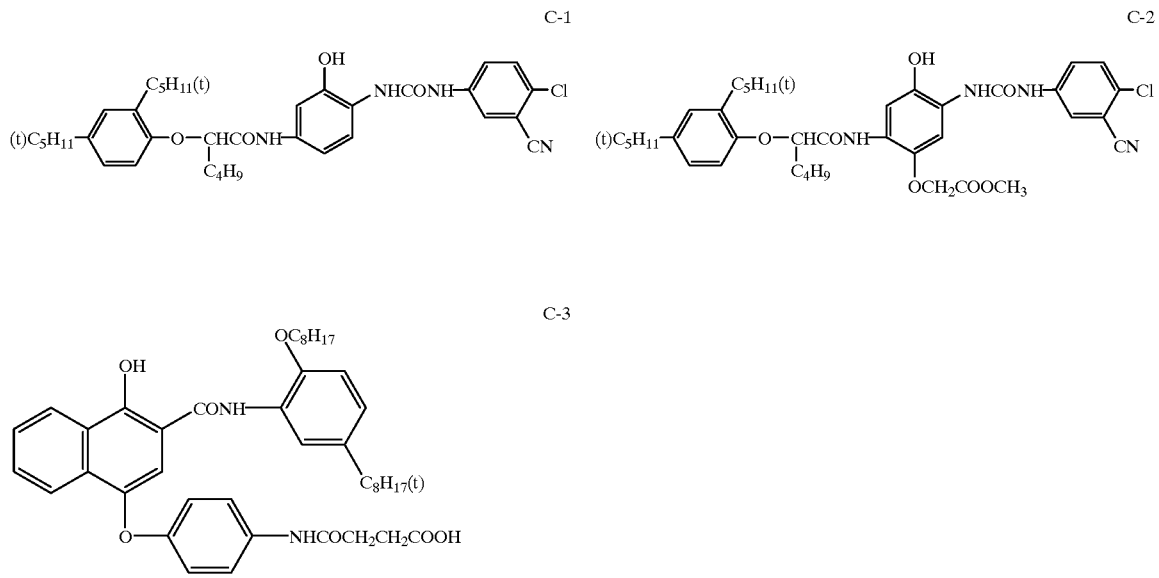

-continued
M-1
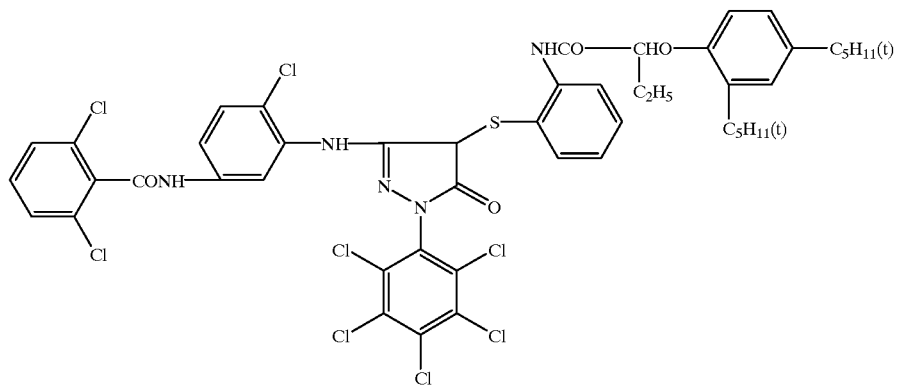
Y-1
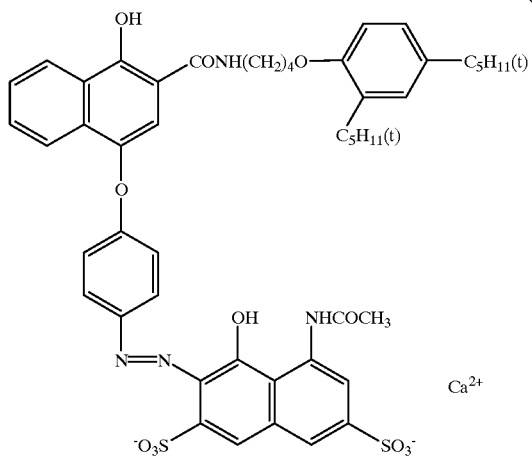
M-2
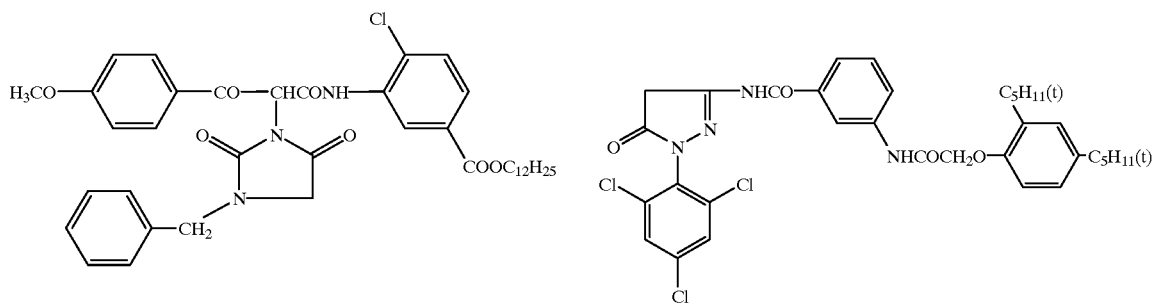
CC-1
CM-1
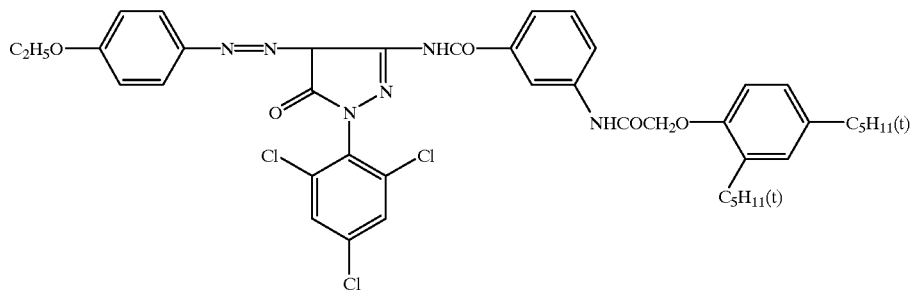

CM-2
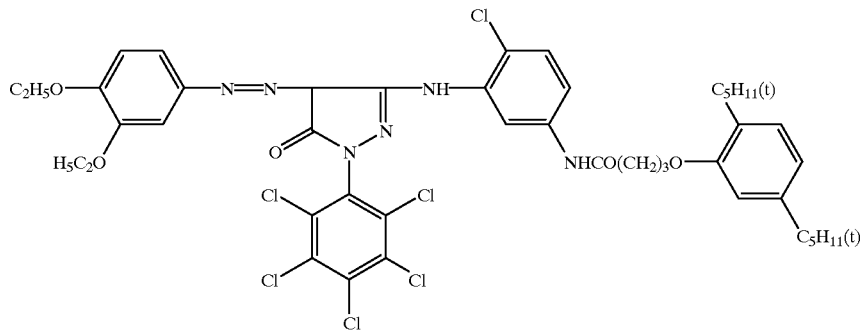
Dl-1
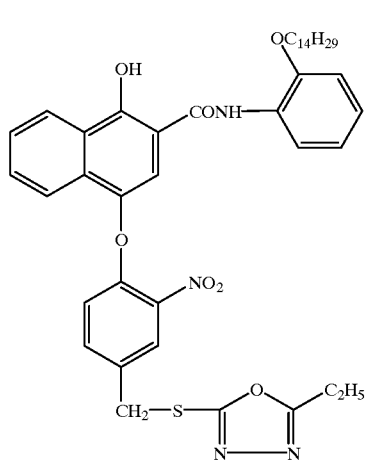
Dl-2
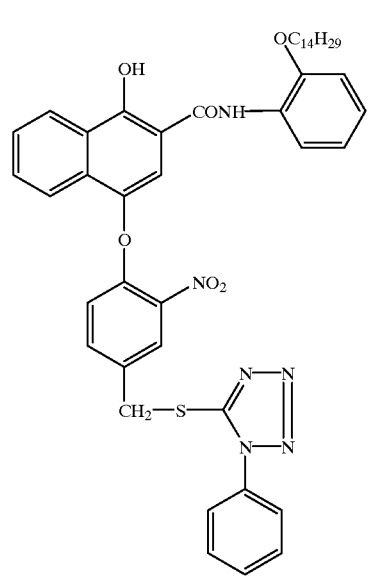
Dl-3
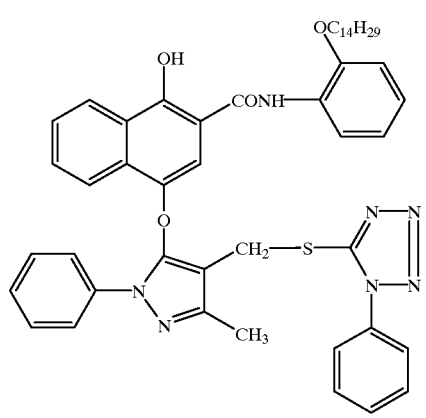
Dl-4
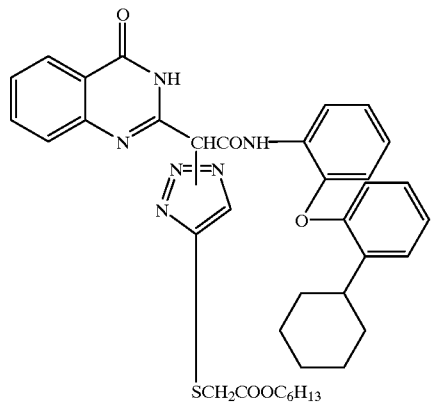
AS-1
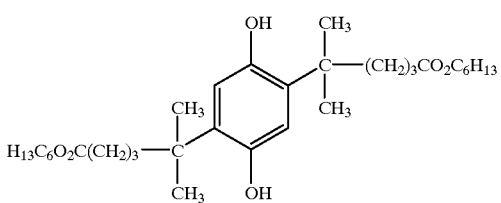
AS-2
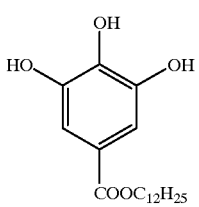

-continued
AS-3
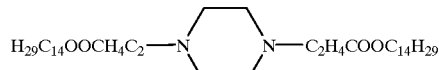
SD-1
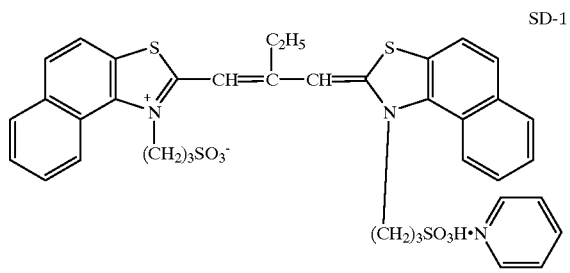
SD-2
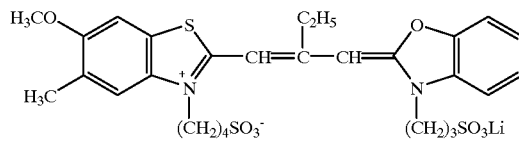
SD-3
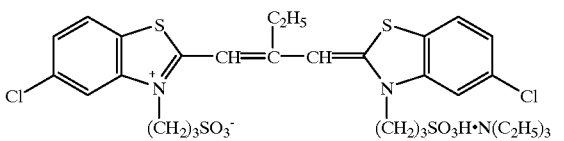
SD-4
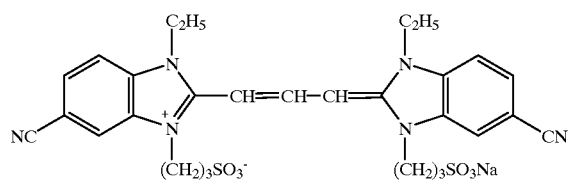
SD-5
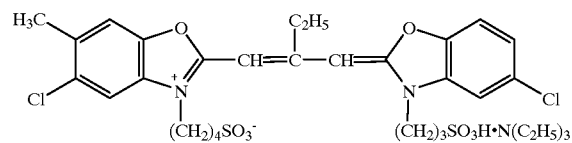
SD-6
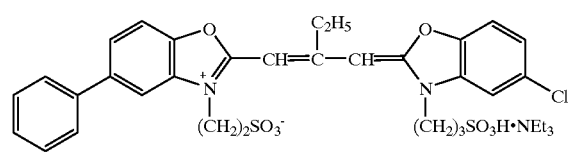
SD-7
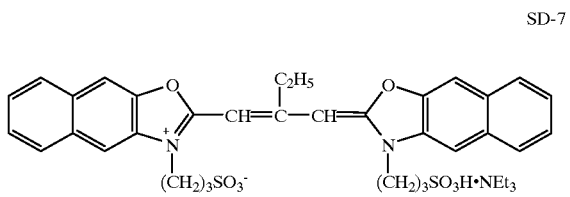
SD-8
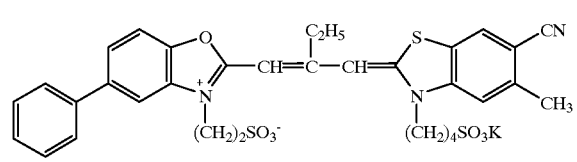
SD-9
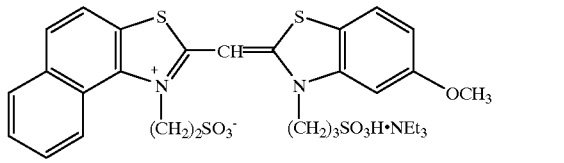
SD-10
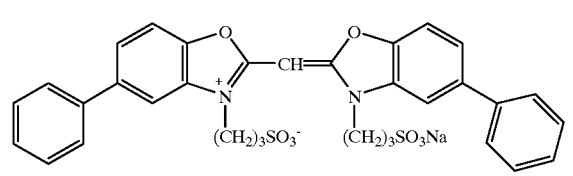
ST-1
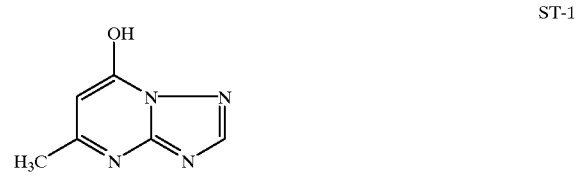
ST-2
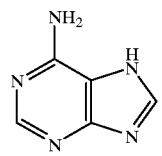
AF-1,2
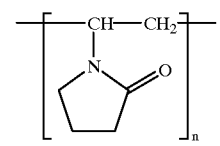

AF-1: Average weight molecular weight (Mw)=10,000
AF-2: Average weight molecular weight (Mw)=1,100,000
n: Polymerization degree
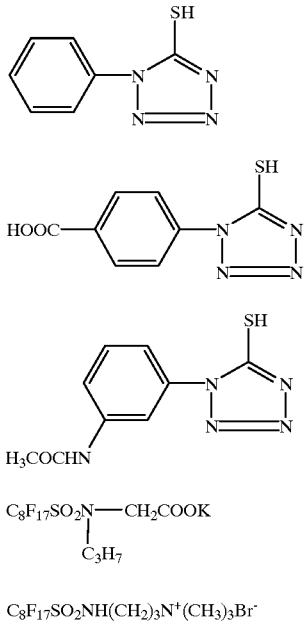
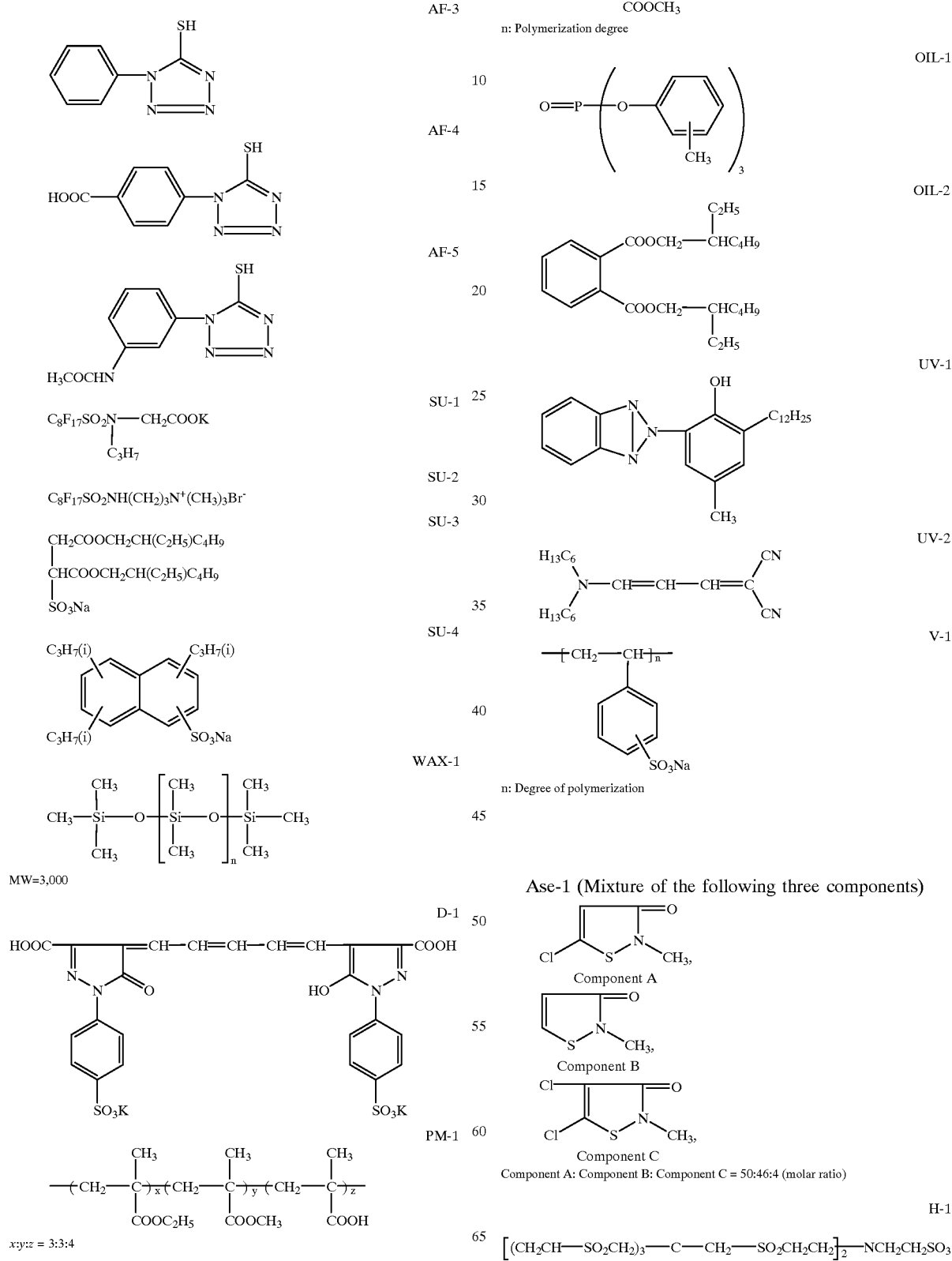

-continued

H-2

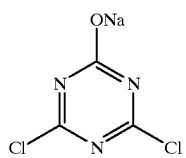

Sample 102 was prepared in the same manner as in Sample 101, except that the addition amounts of the couplers and DIR compounds were varied in the following layers as shown below.

| Layers | Additives whose addition amount is varied | Addition amount |
|---|---|---|
| Third layer | C-1 | 0.48 |
|  | DI-1 | 0.016 |
| Fourth layer | C-2 | 0.47 |
|  | DI-1 | 0.055 |
| Seventh layer | M-1 | 0.27 |
|  | DI-2 | 0.015 |
| Ninth layer | M-1 | 0.24 |
|  | M-2 | 0.46 |
|  | DI-2 | 0.029 |
| Twelfth layer | Y-1 | 1.08 |
|  | DI-4 | 0.022 |
| Thirteenth layer | Y-1 | 0.29 |
|  | DI-4 | 0.01 |

Sample 103 was prepared in the same manner as in Sample 101, except that emulsions used and the addition amounts of DIR compounds were varied in the following layers as shown below.

| Layers | Emulsions to be varied, additives whose addition amount is varied, and additives to be further added | Addition amount |
|---|---|---|
| Third layer | Silver iodobromide h | 0.20 |
|  | DI-1 | 0.03 |
|  | Addition of DI-3 | 0.01 |
| Fourth layer | DI-1 | 0.08 |
|  | Addition of DI-3 | 0.015 |
| Fifth layer | DI-1 | 0.032 |
| Seventh layer | Silver iodobromide h | 0.15 |
|  | DI-2 | 0.022 |
|  | Addition of DI-3 | 0.01 |
| Ninth layer | DI-2 | 0.035 |
|  | DI-3 | 0.015 |
| Tenth layer | DI-2 | 0.01 |
|  | DI-3 | 0.01 |
| Twelfth layer | Silver iodobromide h | 0.10 |
|  | Addition of DI-3 | 0.015 |
|  | DI-4 | 0.025 |
| Thirteenth layer | Addition of DI-3 | 0.01 |
|  | DI-4 | 0.02 |

Sample 104 was prepared in the same manner as in Sample 103, except that 0.07 g/m² of black colloidal silver were further added to the fourteenth layer.

The above obtained samples 101 through 104 were exposed (for 1/125 seconds) through an optical wedge for sensitometry as described previously, and processed according to the following processing condition A or B. Processing condition A

| Processing Step | Processing Time | Processing Temperature | Replenishing Amount* |
|---|---|---|---|
| Color development | 3 min. 15 sec. | 38 ± 0.3° C. | 780 ml |
| Bleaching | 45 sec. | 38 ± 2.0° C. | 150 ml |
| Fixing | 1 min. 30 sec. | 38 ± 2.0° C. | 830 ml |
| Stabilizing | 60 sec. | 38 ± 5.0° C. | 830 ml |
| Drying | 1 min. | 55 ± 5.0° C. | — |

Processing condition B

Processing condition B was the same as in Processing condition A, except that color development step was changed to the following:

| Processing Step | Processing Time | Processing Temperature | Replenishing Amount |
|---|---|---|---|
| Color development | 2 min. 30 sec. | 35 ± 0.3° C. | 780 ml |

The processing step after the development of Processing condition B was the same as Processing condition A.

*Replenishing amount is an amount per m² of light sensitive material processed.

The color developer, bleach, fixer, stabilizer and their replenisher used are as follows: Color developer

| Water | 800 ml |
|---|---|
| Potassium carbonate | 30 g |
| Sodium hydrogencarbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-Amino-3-methyl-N-ethyl-N-(β-hydroxyethyl) aniline sulfate | 4.5 g |
| Diethylene triamine pentaacetic acid | 3.0 g |
| Potassium hydroxide | 1.2 g |

Water was added to make 1 liter, and the developer was regulated to pH 10.06 by the use of potassium hydroxide or a 20% sulfuric acid solution.
Color developer replenisher

| Water | 800 ml |
|---|---|
| Potassium carbonate | 35 g |
| Sodium hydrogencarbonate | 3 g |
| Potassium sulfite | 5 g |
| Sodium bromide | 0.4 g |
| Hydroxylamine sulfate | 3.1 g |
| 4-Amino-3-methyl-N-ethyl-N-(β-hydroxyethyl) aniline sulfate | 6.3 g |
| Potassium hydroxide | 2 g |
| Diethylenetriamine pentaacetic acid | 3.0 g |

Water was added to make 1 liter, and the developer replenisher was regulated to pH 10.18 by the use of potassium hydroxide or a 20% sulfuric acid solution.
Bleach

| Water | 700 ml |
|---|---|
| Ferric (III) ammonium of 1,3-diaminopropane tetraacetic acid | 125 g |
| Ethylenediaminetetraacetic acid | 2 g |
| Sodium nitrate | 40 g |

-continued

| | |
|---|---|
| Ammonium bromide | 150 g |
| Glacial acetic acid | 40 g |

Water was added to make 1 liter, and the bleach was regulated to pH 4.4 by the use of aqueous ammonia or glacial acetic acid.

Bleach replenisher

| | |
|---|---|
| Water | 700 ml |
| Ferric (III) ammonium of 1,3-diaminopropane tetraacetic acid | 175 g |
| Ethylenediaminetetraacetic acid | 2 g |
| Sodium nitrate | 50 g |
| Ammonium bromide | 200 g |
| Glacial acetic acid | 56 g |

The bleach replenisher was regulated to pH 4.4 by the use of aqueous ammonia or glacial acetic acid, and then, water was added to make 1 liter.

Fixer

| | |
|---|---|
| Water | 800 ml |
| Ammonium thiocyanate | 120 g |
| Ammonium thiosulfate | 150 g |
| Sodium sulfite | 15 g |
| Ethylenediaminetetraacetic acid | 2 g |

The fixer was regulated to pH 6.2 by the use of aqueous ammonia or glacial acetic acid, and then, water was added to make 1 liter.

Fixer replenisher

| | |
|---|---|
| Water | 800 ml |
| Ammonium thiocyanate | 150 g |
| Ammonium thiosulfate | 180 g |
| Sodium sulfite | 20 g |
| Ethylenediaminetetraacetic acid | 2 g |

The fixer replenisher was regulated to pH 6.5 by the use of aqueous ammonia or glacial acetic acid, and then, water was added to make 1 liter.

Stabilizer and stabilizer replenisher

| | |
|---|---|
| Water | 900 ml |
| p-Octylphenyl polyoxyethylene ether (n = 10) | 2.0 g |
| Dimethylol urea | 0.5 g |
| Hexamethylenetetramine | 0.2 g |
| 1,2-Benzisothiazoline-3-one | 0.1 g |
| Siloxane (L-77 produced by UCC) | 0.1 g |
| Aqueous ammonia | 0.5 ml |

Water was added to make 1 liter, and then, the pH was regulated to 8.5 by the use of aqueous ammonia or a 50% sulfuric acid solution.

The processed samples were measured under status M condition employing a densitometer Model 310T produced by X-rite Corporation. The measured densities were plotted against exposure amounts, and a characteristic curve, showing the relation between the densities and exposure amounts, was obtained on the D-log E coordinates. Thereafter, ISO sensitivity, latitude L, gamma $\gamma$ and L×$\gamma$ were obtained. The results are shown in Table 4.

TABLE 4

| Sample No. | Processing step used | ISO sensitivity | L | $\gamma$ | L × $\gamma$ |
|---|---|---|---|---|---|
| Sample 101 | A | 620 | 2.5 | 0.63 | 1.58 |
| Sample 102 | B | 470 | 3.7 | 0.60 | 2.22 |
| Sample 103 | A | 430 | 3.6 | 0.45 | 1.62 |
| Sample 103 | B | 430 | 3.9 | 0.38 | 1.48 |
| Sample 104 | B | 120 | 3.8 | 0.38 | 1.44 |

3. Film Unit to be tested

Unexposed photographic films having respectively sample numbers 101–104 were loaded respectively in the photographing units 1–7, and film units to be tested with sample numbers 201–215 shown in Table 5 were prepared, in combination with processing conditions.

TABLE 5

| Sample | Photographing Unit | Photographic Film | Processing Condition |
|---|---|---|---|
| 201(Comp.) | Unit 1 | 101 | A |
| 202(Comp.) | Unit 1 | 103 | A |
| 203(Inv.) | Unit 2 | 101 | A |
| 204(Inv.) | Unit 2 | 103 | A |
| 205(Inv.) | Unit 3 | 101 | A |
| 206(Inv.) | Unit 3 | 103 | A |
| 207(Inv.) | Unit 4 | 101 | A |
| 208(Inv.) | Unit 4 | 103 | A |
| 209(Inv.) | Unit 5 | 102 | B |
| 210(Inv.) | Unit 5 | 103 | A |
| 211(Inv.) | Unit 5 | 103 | B |
| 212(Inv.) | Unit 6 | 103 | B |
| 213(Inv.) | Unit 6 | 104 | B |
| 214(Inv.) | Unit 7 | 103 | A |
| 215(Inv.) | Unit 7 | 103 | B |

Comp.: Comparative, Inv.: Present invention

By using the film units to be tested with sample numbers 201–215 stated above, three charts respectively in white (reflection density=0.05), gray (reflection density=0.70) and black (reflection density=1.50) were photographed on the same frame of the film, in an indoor gymnasium (Photographing condition I) at night illuminated by a metal halide lamp to luminance 200 lux (1×), in the shade (Photographing condition II) at daytime with luminance of 1500 lux, and under direct rays of the sun at daytime in the open air (Photographing condition III). The exposed films thus obtained were developed under the developing condition A or B, then magnification for enlargement was adjusted in the NPS-878 printer made by Konica so that a size of an object on the print may be the same, print density was adjusted so that reflection density of the gray chart may be 0.7, and a print was made on Konica color paper QAA7 with a size of 89×127 mm. Then, reflection density (Dw) on the white chart portion and reflection density (D Bk) on the black chart portion on prints obtained under the Photographing condition I were measured, and a difference between them $\Delta DI=Bk-Dw$ was calculated. In the same way, $\Delta DII$ and $\Delta DIII$ were also calculated with respect to prints made respectively under Photographing condition II and Photographing condition III. When the $\Delta D$ value is smaller among Photographing conditions I, II and III, it means that the photographic finish is excellent with well-balanced gradation under any photographing conditions with different luminances. Therefore, the values of $\Delta DI/\Delta DII$ and $\Delta DIII/\Delta DII$ are obtained on the reference of Photographing condition II, and they are shown in Table 6. When each of $\Delta DI/\Delta DII$ and $\Delta DIII/\Delta DII$ is closer to 1 in this case, it shows that a print is of an excellent finish despite different luminances.

TABLE 6

| Samples | Ev value | System sensitivity | Focal length of a lens | Electronic flash unit GN | L + 0.3S | L × γ | ΔDI/ ΔDII | ΔDIII/ ΔDII |
|---|---|---|---|---|---|---|---|---|
| 201(Comp.) | 13.28 | 6.38 | 30 mm | 11 | 4.22 | 1.58 | 0.75 | 0.83 |
| 202(Comp.) | 13.28 | 6.27 | 30 mm | 11 | 5.48 | 1.62 | 0.72 | 0.92 |
| 203(Inv.) | 10.84 | 3.31 | 30 mm | 11 | 3.49 | 1.58 | 0.98 | 0.82 |
| 204(Inv.) | 10.84 | 3.83 | 30 mm | 11 | 4.75 | 1.62 | 0.95 | 0.96 |
| 205(Inv.) | 9.93 | 2.40 | 30 mm | 6 | 3.22 | 1.58 | 1.02 | 0.78 |
| 206(Inv.) | 9.93 | 2.92 | 30 mm | 6 | 4.48 | 1.62 | 0.96 | 0.94 |
| 207(Inv.) | 9.93 | 2.40 | 10 mm | 6 | 3.22 | 1.58 | 1.03 | 0.77 |
| 208(Inv.) | 9.93 | 2.92 | 10 mm | 6 | 4.48 | 1.62 | 1.02 | 0.96 |
| 209(Inv.) | 9.29 | 2.15 | 10 mm | 6 | 4.35 | 2.22 | 1.03 | 0.97 |
| 210(Inv.) | 9.29 | 2.28 | 10 mm | 6 | 4.28 | 1.62 | 1.00 | 0.98 |
| 211(Inv.) | 9.29 | 2.28 | 10 mm | 6 | 4.66 | 1.48 | 0.96 | 0.94 |
| 212(Inv.) | 7.87 | 0.86 | 10 mm | 6 | 4.24 | 1.48 | 1.04 | 0.88 |
| 213(Inv.) | 7.87 | 2.71 | 10 mm | 6 | 4.61 | 1.44 | 0.92 | 0.94 |
| 214(Inv.) | 8.96 | 1.95 | 10 mm | None | 4.19 | 1.62 | 1.02 | 0.90 |
| 215(Inv.) | 8.96 | 1.95 | 10 mm | None | 4.56 | 1.48 | 1.02 | 0.93 |

Comp.: Comparative, Inv.: Present invention

As stated above, by making the system sensitivity index to be 0–4.5 with regard to the structure of a lens-fitted film unit of the invention, it was possible to obtain an effect of remarkable improvement in print quality. Further, when each of a latitude and a γ value of the loaded film is made to be within each of the ranges of the expressions (1) and (2), an improvement in quality of the print of the outdoor scene at daytime is clear. It is understood that the effect stated above is further raised when the focal length of the camera lens is changed from 30 mm to 10 mm.

Comparative Test 2

Next, snapshots were made at night for 100 scenes each. In this case, in the photographing at night, an electronic flash unit was used for all scenes, excluding unit 7. The exposed films thus obtained were developed under the developing condition A or B, and the developed film was used on the NPS-878J printer made by Konica wherein magnification for enlargement is adjusted so that a size of an object on the print may be the same, to make a print on Konica color paper QAA7 having a size of 89×127 mm. These prints were evaluated by 10 determiners who were selected at random from ordinary users. The determiners evaluated each print in 5 ranks including 1 (poor)–5 (excellent), and the average score for all prints is shown in Table 7.

TABLE 7

| Samples | Reproduction of brightness | Sharpness |
|---|---|---|
| 201(Comp.) | 2.4 | 2.8 |
| 202(Comp.) | 2.1 | 2.2 |
| 203(Inv.) | 2.8 | 1.7 |
| 204(Inv.) | 3.4 | 1.9 |
| 205(Inv.) | 3.3 | 1.8 |
| 206(Inv.) | 3.1 | 2.0 |
| 207(Inv.) | 3.5 | 3.9 |
| 208(Inv.) | 3.3 | 3.4 |
| 209(Inv.) | 3.8 | 4.1 |
| 210(Inv.) | 4.1 | 3.9 |
| 211(Inv.) | 3.7 | 3.7 |
| 212(Inv.) | 3.8 | 3.4 |
| 213(Inv.) | 3.4 | 3.3 |
| 214(Inv.) | 3.7 | 3.6 |
| 215(Inv.) | 3.5 | 3.4 |

Comp.: Comparative, Inv.: Present invention

Comparative Example 3

With regard to developed negative films prepared in Comparative Example 1, negative images on samples 201–206 were read by a film scanner (DuoScan made by Agfa) at 1333 ppi, and negative images on samples 207–215 were read by the film scanner at 4000 ppi. After digital color images thus obtained were corrected so that contrast and image tone may be optimum on the CRT printer made by Konica, a print was made on Konica color paper QAA7 having a size of 89×127 mm. These prints were evaluated by 10 determiners who were selected at random from ordinary users. The determiners evaluated each print in 5 ranks including 1 (poor)–5 (excellent), and the average score for all prints is show n in Table 8.

TABLE 8

| Samples | Reproduction of brightness | Sharpness |
|---|---|---|
| 201(Comp.) | 3.2 | 3.1 |
| 202(Comp.) | 3.2 | 3.0 |
| 203(Inv.) | 3.3 | 2.2 |
| 204(Inv.) | 3.9 | 2.4 |
| 205(Inv.) | 3.5 | 2.3 |
| 206(Inv.) | 4.1 | 2.5 |
| 207(Inv.) | 3.5 | 3.8 |
| 208(Inv.) | 3.9 | 3.9 |
| 209(Inv.) | 4.0 | 4.1 |
| 210(Inv.) | 4.3 | 4.4 |
| 211(Inv.) | 4.4 | 4.2 |
| 212(Inv.) | 4.6 | 4.2 |
| 213(Inv.) | 4.4 | 3.8 |
| 214(Inv.) | 3.8 | 3.7 |
| 215(Inv.) | 4.0 | 3.8 |

Comp.: Comparative, Inv.: Present invention

When images of the developed film are converted into digital image information, then the digital image information are subjected to contrast adjustment and image tone adjustment, and a print is made on a print-use silver halide color photographic light-sensitive material, as stated above, an effect of remarkable improvement in print quality due to the invention was obtained, compared with Comparative Example 1 of a conventional analogue optical print.

The structure of the invention makes it possible to provide a leris-fitted film unit, an image outputting method and a print wherein under exposure and over exposure are less caused even in the case of a simplified camera, and a highly satisfactory photographic print with less failure can be obtained regardless of a photographer and of a place of photographing.

In addition, the structure of the invention makes a lens-fitted film unit to be one having no electronic flash unit, because it is possible to photograph under a clouded sky, in a rainy day or in a room without using an electronic flash unit.

Further, the structure of the invention makes it possible to provide a lens-fitted film unit of a card type whose maximum thickness is 7–23 mm, by using a lens with a short focal length, loading a disk-shaped sheet film and by housing no electronic flash unit.

What is claimed is:

1. A lens-fitted film unit comprising:
    an unexposed film having an ISO sensitivity Sviso;
    a lens having a fixed focal length of f (mm) and a fixed f-number F;
    a shutter having a fixed shutter speed T (sec); and
    a system sensitivity index S larger than 0 and smaller than 3.0;
    wherein the system sensitivity index S is represented as follows:
    S=EV value Ev−Film sensitivity index Sv
    Ev=3.32 $\log_{10}$ (F$^2$/T)
    Sv=3.32 $\log_{10}$(0.3×Sviso).

2. The lens-fitted film unit of claim 1, further comprising: a body having a maximum thickness of 7 mm to 23 mm.

3. The lens-fitted film unit of claim 1, wherein the unexposed film is a sheet film having a film frame size in which a short side is 7 mm to 14 mm and a long side is 10 mm to 20 mm.

4. The lens-fitted film unit of claim 1, wherein the EV value Ev is 6.5 to 11.

5. The lens-fitted film unit of claim 1, further comprising a strobe unit having a guide number of 10 or less.

6. The lens-fitted film unit of claim 1, wherein the fixed focal length is 5 mm to 20 mm.

7. The lens-fitted film unit of claim 6, wherein the fixed focal length is 5 mm to 16 mm.

8. The lens-fitted film unit of claim 1, wherein the fixed shutter speed T is 1/150 seconds to 1/25 seconds.

9. The lens-fitted film unit of claim 1, wherein the fixed f-number F is 2 to 8.5.

10. The lens-fitted film unit of claim 1, wherein a latitude L of the unexposed film and the system sensitivity index S satisfy the following expression (1):

$$4.3 \leq L+0.3S \leq 4.9 \qquad (1).$$

11. The lens-fitted film unit of claim 1, wherein a latitude L and a gamma value γ of the unexposed film satisfy the following expression (2):

$$1.0 \leq L \times \gamma \leq 2.0 \qquad (2).$$

12. A lens-fitted film unit comprising:
    an unexposed film having an ISO sensitivity Sviso;
    a lens having a fixed focal length of f (mm) and a fixed f-number F;
    a shutter having a fixed shutter speed T (sec); and
    a system sensitivity index S larger than 0 and not larger than 4.5;
    wherein the system sensitivity index S is represented as follows:
    S=EV value Ev−Film sensitivity index Sv
    Ev=3.32 $\log_{10}$ (F$^2$/T)
    Sv=3.32 $\log_{10}$ (0.3×Sviso), and
    wherein a latitude L of the unexposed film and the system sensitivity index S satisfy: $4.3 \leq L+0.3\ S \leq 4.9$.

13. A lens-fitted film unit comprising:
    an unexposed film having an ISO sensitivity Sviso;
    a lens having a fixed focal length of f (mm) and a fixed f-number F;
    a shutter having a fixed shutter speed T (sec); and
    a system sensitivity index S larger than 0 and not larger than 4.5;
    wherein the system sensitivity index S is represented as follows:
    S=EV value Ev−Film sensitivity index Sv
    Ev=3.32 $\log_{10}$ (F$^2$/T)
    Sv=3.32 $\log_{10}$ (0.3×Sviso), and
    wherein a latitude L and a gamma value γ of the unexposed film satisfy: $1.0 \leq L \times \gamma \leq 2.0$.

* * * * *